United States Patent
Tolentino et al.

(10) Patent No.: US 10,005,431 B2
(45) Date of Patent: *Jun. 26, 2018

(54) VORTEX DAMPING WIPER BLADE

(71) Applicant: Pylon Manufacturing Corp., Deerfield Beach, FL (US)

(72) Inventors: Vambi Raymundo Tolentino, Coconut Creek, FL (US); Robert Peter Peers, Boca Raton, FL (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/260,004

(22) Filed: Sep. 8, 2016

(65) Prior Publication Data
US 2016/0375867 A1    Dec. 29, 2016

Related U.S. Application Data

(63) Continuation of application No. 13/453,601, filed on Apr. 23, 2012, now Pat. No. 9,457,768.

(60) Provisional application No. 61/477,908, filed on Apr. 21, 2011.

(51) Int. Cl.
*B60S 1/38* (2006.01)

(52) U.S. Cl.
CPC ............ *B60S 1/3881* (2013.01); *B60S 1/381* (2013.01); *B60S 1/3848* (2013.01); *B60S 1/3856* (2013.01); *B60S 1/3863* (2013.01); *B60S 1/3806* (2013.01); *B60S 1/3808* (2013.01); *B60S 1/3867* (2013.01); *B60S 2001/3843* (2013.01)

(58) Field of Classification Search
CPC .... B60S 1/3863; B60S 1/3848; B60S 1/3806; B60S 1/3867; B60S 1/381
See application file for complete search history.

(56) References Cited

U.S. PATENT DOCUMENTS

| | | |
|---|---|---|
| D56,762 S | 12/1920 | Minier |
| 2,310,751 A | 2/1943 | Scinta |
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |

(Continued)

FOREIGN PATENT DOCUMENTS

| | | |
|---|---|---|
| AR | 206463 | 7/1976 |
| AU | 409933 | 2/1971 |

(Continued)

OTHER PUBLICATIONS

Non-Final Rejection towards U.S. Appl. No. 13/453,601 dated Jul. 9, 2013.

(Continued)

*Primary Examiner* — Michael Jennings
(74) *Attorney, Agent, or Firm* — Cozen O'Connor

(57) ABSTRACT

A windshield wiper blade cover and a wiper blade. The windshield wiper blade cover being capable of being disposed on the top side of a wiper blade. The cover has a base portion having a height and a raised portion having a height, the height of the raised portion is greater than the height of the base portion, and the height of the raised portion gradually decreases as the raised portion approaches the outer ends of the cover.

13 Claims, 8 Drawing Sheets

(56) References Cited

U.S. PATENT DOCUMENTS

| | | |
|---|---|---|
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynm |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,120,069 A | 10/1978 | Sharp et al. |
| 4,127,912 A | 12/1978 | Deibel et al. |
| 4,127,916 A | 12/1978 | Van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,334,001 A | 6/1982 | Horie et al. |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Epple et al. |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |

(56) References Cited

U.S. PATENT DOCUMENTS

| | | |
|---|---|---|
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,449 A | 12/1994 | Bauer et al. |
| 5,383,248 A | 1/1995 | Hi |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| D367,839 S | 3/1996 | Abbott et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| 5,633,932 A | 5/1997 | Davis et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merket et al. |
| 6,295,690 B1 | 10/2001 | Merkel et al. |
| 6,301,742 B1 | 10/2001 | Kota |
| 6,305,066 B1 | 10/2001 | De Paolo et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |

(56) References Cited

U.S. PATENT DOCUMENTS

| | | |
|---|---|---|
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weilet et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| D592,121 S | 5/2009 | Bratec et al. |
| 7,526,832 B2 | 5/2009 | Matsumoto et al. |
| 7,527,151 B2 | 5/2009 | Park |
| D593,480 S | 6/2009 | Kim |
| D593,923 S | 6/2009 | Bratec et al. |

(56) References Cited

U.S. PATENT DOCUMENTS

| | | |
|---|---|---|
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 | 9/2009 | Hussaini et al. |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westerman et al. |
| 7,634,833 B2 | 12/2009 | Boland et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,690,509 B2 | 4/2010 | Herring et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| D627,288 S | 11/2010 | Lee |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer |
| 7,908,703 B2 | 3/2011 | Van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Chiang |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabee et al. |
| 7,975,849 B2 | 7/2011 | Kim |
| 7,979,950 B2 | 7/2011 | Boland |
| 7,989,955 B2 | 8/2011 | Yagi |
| 7,989,995 B2 | 8/2011 | Reith et al. |
| 7,992,248 B2 | 8/2011 | Koppen et al. |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,024,836 B2 | 9/2011 | Moll et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,156,604 B2 | 4/2012 | Kraus et al. |
| 8,156,605 B2 | 4/2012 | Dietrich et al. |
| 8,165,796 B2 | 4/2012 | Hoetzer |
| D658,494 S | 5/2012 | Raimer et al. |
| 8,166,605 B2 | 5/2012 | Lee |
| 8,169,791 B2 | 5/2012 | Wolf et al. |
| 8,180,518 B2 | 5/2012 | Petricoin, Jr. |
| 8,181,305 B2 | 5/2012 | Boos |
| 8,181,306 B2 | 5/2012 | Merkel |
| 8,181,307 B2 | 5/2012 | Wilms et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,191,201 B2 | 6/2012 | De Block et al. |
| 8,196,253 B2 | 6/2012 | Barlas |
| 8,196,254 B2 | 6/2012 | Mahfoudh et al. |
| 8,196,255 B2 | 6/2012 | De Block et al. |
| 8,205,290 B2 | 6/2012 | Weiler et al. |
| 8,205,291 B2 | 6/2012 | Eschenbrenner et al. |
| 8,214,965 B2 | 7/2012 | Volz et al. |
| 8,230,547 B2 | 7/2012 | Wilms et al. |
| 8,234,746 B2 | 8/2012 | Lutterodt et al. |
| 8,245,350 B2 | 8/2012 | Van De Rostyne et al. |
| 8,256,851 B2 | 9/2012 | Pelosse |
| 8,261,403 B2 | 9/2012 | Ehde |
| 8,261,405 B2 | 9/2012 | Kim et al. |
| 8,261,628 B2 | 9/2012 | Moecklin et al. |
| 8,266,759 B2 | 9/2012 | Braun et al. |
| 8,272,096 B2 | 9/2012 | Wilms et al. |
| 8,272,360 B2 | 9/2012 | Hartmann et al. |
| 8,286,533 B2 | 10/2012 | Hurst et al. |
| 8,294,327 B2 | 10/2012 | Chaumet et al. |
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 | 1/2013 | Koppen et al. |
| 8,347,449 B2 | 1/2013 | Genet et al. |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |
| 8,370,988 B2 | 2/2013 | Kraus et al. |
| 8,373,322 B2 | 2/2013 | Wegner et al. |
| 8,375,503 B2 | 2/2013 | Aznag |
| 8,381,348 B2 | 2/2013 | Egner-Walter et al. |
| 8,381,349 B2 | 2/2013 | Ku |
| 8,381,350 B2 | 2/2013 | Op't Roodt et al. |
| 8,397,340 B2 | 3/2013 | Weiler et al. |
| 8,397,341 B2 | 3/2013 | Ehde |

(56) References Cited

U.S. PATENT DOCUMENTS

| | | |
|---|---|---|
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt et al. |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mili et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |
| 9,096,196 B2 | 8/2015 | Criel et al. |
| 9,108,595 B2 | 8/2015 | Tolentino et al. |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |
| 9,260,085 B2 | 2/2016 | Bex et al. |
| 9,266,504 B2 | 2/2016 | De Block |
| 9,272,676 B2 | 3/2016 | Heger et al. |
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |

(56) References Cited

U.S. PATENT DOCUMENTS

| | | |
|---|---|---|
| D796,413 S | 9/2017 | Di Iulio |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Harita et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0052865 A1 | 3/2008 | Chiang |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0098559 A1 | 5/2008 | Machida et al. |
| 2008/0115308 A1 | 5/2008 | Lee |
| 2008/0148509 A1 | 6/2008 | Bacarella et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0251502 A1 | 10/2010 | Summerville et al. |
| 2010/0281645 A1 | 11/2010 | Kim et al. |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Baelen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0030894 A1 | 2/2012 | Garrastacho et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |
| 2013/0067675 A1 | 3/2013 | Chien |
| 2013/0067678 A1 | 3/2013 | Ehde |
| 2013/0104334 A1 | 5/2013 | Depondt |
| 2013/0117957 A1 | 5/2013 | Ku |
| 2013/0125333 A1 | 5/2013 | Tolentino et al. |
| 2013/0152323 A1 | 6/2013 | Chien |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0185889 A1 | 7/2013 | Tolentino et al. |
| 2013/0185890 A1 | 7/2013 | Ku |
| 2013/0192016 A1 | 8/2013 | Kim et al. |
| 2013/0198992 A1 | 8/2013 | Tolentino et al. |
| 2013/0205532 A1 | 8/2013 | Tolentino et al. |
| 2013/0212828 A1 | 8/2013 | Coughlin |
| 2013/0219649 A1 | 8/2013 | Tolentinto et al. |
| 2013/0227809 A1 | 9/2013 | Tolentinto et al. |
| 2013/0227810 A1 | 9/2013 | Tolentinto et al. |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0291329 A1 | 11/2013 | Izabel |
| 2013/0298348 A1 | 11/2013 | Caillot et al. |
| 2013/0305475 A1 | 11/2013 | Kim et al. |
| 2013/0305478 A1 | 11/2013 | Kim et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |

(56) References Cited

U.S. PATENT DOCUMENTS

| | | | |
|---|---|---|---|
| 2014/0082875 A1 | 3/2014 | Peers et al. |
| 2014/0115811 A1 | 5/2014 | Kim et al. |
| 2014/0130283 A1 | 5/2014 | Boland et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |
| 2014/0196241 A1 | 7/2014 | Kim et al. |
| 2014/0259504 A1 | 9/2014 | Piotrowski et al. |
| 2014/0259505 A1 | 9/2014 | Fournier et al. |
| 2014/0283325 A1 | 9/2014 | Kawashima et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0135468 A1 | 5/2015 | Kim |
| 2015/0151718 A1 | 6/2015 | Moll |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274130 A1 | 10/2015 | Tolentinto et al. |
| 2015/0274131 A1 | 10/2015 | Tolentinto et al. |
| 2015/0353054 A1 | 12/2015 | Tolentinto et al. |
| 2016/0059828 A1 | 3/2016 | Tolentinto et al. |
| 2016/0159323 A1 | 6/2016 | Tolentinto et al. |
| 2016/0280186 A1 | 9/2016 | Peers et al. |
| 2017/0057464 A1 | 3/2017 | Tolentinto et al. |
| 2017/0072912 A1 | 3/2017 | Tolentinto et al. |
| 2017/0113656 A1 | 4/2017 | Tolentino |
| 2017/0334400 A1 | 11/2017 | Kawashima |
| 2017/0334404 A1 | 11/2017 | Kawashima |
| 2017/0334406 A1 | 11/2017 | Kawashima |
| 2017/0334407 A1 | 11/2017 | Kawashima |
| 2017/0334769 A1 | 11/2017 | Luzzato et al. |

FOREIGN PATENT DOCUMENTS

| | | |
|---|---|---|
| AU | 410701 | 2/1971 |
| AU | 649730 | 6/1994 |
| AU | 729371 | 7/2001 |
| AU | 741730 | 12/2001 |
| AU | 762557 | 6/2003 |
| AU | 770944 | 3/2004 |
| AU | 2003257828 | 3/2004 |
| AU | 780818 | 4/2005 |
| AU | 2006100618 | 8/2006 |
| AU | 2006241297 | 6/2007 |
| AU | 2006203445 | 10/2007 |
| AU | 2008100641 | 8/2008 |
| AU | 2009238193 | 10/2009 |
| AU | 2009324257 | 8/2010 |
| AU | 2010294766 A1 | 2/2012 |
| BR | 8304484 | 4/1984 |
| BR | 8604381 | 5/1987 |
| BR | 8707390 | 11/1988 |
| BR | 8903473 | 3/1990 |
| BR | 8907154 | 2/1991 |
| BR | 9005080 | 8/1991 |
| BR | 9105809 | 8/1992 |
| BR | 9200129 | 10/1992 |
| BR | 0006164 | 4/2001 |
| BR | 0007263 | 10/2001 |
| BR | 0106665 | 4/2002 |
| BR | 0106667 | 4/2002 |
| BR | 0306135 | 10/2004 |
| BR | PI0411532 | 8/2006 |
| BR | PI0506158 | 10/2006 |
| BR | PI0007263 | 1/2009 |
| BR | PI0519259 | 1/2009 |
| BR | 0006917 | 8/2009 |
| BR | PI0606903 | 8/2009 |
| BR | PI0901324 | 4/2010 |
| BR | PI0006963 | 9/2010 |
| BR | PI0706762 | 4/2011 |
| BR | PI1000961 | 6/2011 |
| BR | PI0621265 | 12/2011 |
| BR | 102015007588 A2 | 4/2016 |
| CA | 954258 | 9/1974 |
| CA | 966609 | 4/1975 |
| CA | 1038117 | 9/1978 |
| CA | 1075414 | 4/1980 |
| CA | 1124462 | 6/1982 |
| CA | 1184712 | 4/1985 |
| CA | 1257059 | 7/1989 |
| CA | 1263803 | 12/1989 |
| CA | 2027227 | 4/1991 |
| CA | 1289308 | 9/1991 |
| CA | 2037400 | 2/1992 |
| CA | 2093956 | 4/1992 |
| CA | 2079846 | 7/1993 |
| CA | 2118874 | 9/1994 |
| CA | 2156345 | 2/1996 |
| CA | 2174030 | 5/1997 |
| CA | 2260175 | 1/1998 |
| CA | 2220462 | 7/1998 |
| CA | 2243143 | 1/1999 |
| CA | 2344888 | 4/2000 |
| CA | 2414099 | 1/2002 |
| CA | 2472914 | 8/2003 |
| CA | 2487799 | 12/2003 |
| CA | 2515071 | 8/2004 |
| CA | 2242776 | 7/2005 |
| CA | 2553977 | 9/2005 |
| CA | 2554048 A1 | 9/2005 |
| CA | 2514372 | 1/2006 |
| CA | 2574330 | 2/2006 |
| CA | 2523315 | 4/2006 |
| CA | 2541641 | 4/2006 |
| CA | 2522729 | 6/2006 |
| CA | 2598104 | 9/2006 |
| CA | 2550409 | 11/2006 |
| CA | 2568561 | 5/2007 |
| CA | 2569175 | 5/2007 |
| CA | 2569176 | 5/2007 |
| CA | 2569977 | 6/2007 |
| CA | 2560155 | 9/2007 |
| CA | 2645821 | 10/2007 |
| CA | 2649474 | 11/2007 |
| CA | 2649760 | 11/2007 |
| CA | 2651069 | 11/2007 |
| CA | 2590443 | 4/2008 |
| CA | 2631513 | 5/2008 |
| CA | 2574242 | 7/2008 |
| CA | 2617013 | 11/2008 |
| CA | 2628517 | 4/2009 |
| CA | 2671767 | 1/2010 |
| CA | 2500891 | 5/2011 |
| CA | 2789431 | 8/2011 |
| CA | 2809243 | 3/2012 |
| CA | 2809292 | 3/2012 |
| CA | 2809947 | 3/2012 |
| CA | 2831801 A1 | 10/2012 |
| CA | 2835703 | 11/2012 |
| CA | 2843527 | 1/2013 |
| CA | 2843637 | 2/2013 |
| CA | 2843644 | 2/2013 |
| CA | 2797693 | 5/2013 |
| CA | 147027 S | 6/2013 |
| CA | 147028 S | 6/2013 |
| CA | 2799267 | 6/2013 |
| CA | 2740384 | 7/2013 |
| CA | 2865292 A1 | 8/2013 |
| CA | 2906863 A1 | 9/2014 |
| CA | 2898928 A1 | 1/2017 |
| CA | 2865295 C | 3/2017 |
| CL | 2014002239 A1 | 5/2015 |
| CL | 2014002241 A1 | 5/2015 |

(56) References Cited

FOREIGN PATENT DOCUMENTS

| | | |
|---|---|---|
| CL | 2015002693 A1 | 4/2016 |
| CN | 101983148 | 3/2011 |
| CN | 202593459 | 12/2012 |
| CN | 102963337 | 3/2013 |
| CN | 102991462 | 3/2013 |
| CN | 102991466 | 3/2013 |
| CN | 103101514 | 5/2013 |
| CN | 103101516 | 5/2013 |
| CN | 103108782 | 5/2013 |
| CN | 103183008 | 7/2013 |
| CN | 103183009 | 7/2013 |
| CN | 103223923 | 7/2013 |
| CN | 103228498 | 7/2013 |
| CO | 7141449 A2 | 12/2014 |
| CO | 7141460 A2 | 12/2014 |
| DE | 2309063 | 8/1974 |
| DE | 2311293 | 9/1974 |
| DE | 2353368 | 5/1975 |
| DE | 3222864 | 12/1983 |
| DE | 3919050 A1 | 12/1990 |
| DE | 4439275 A1 | 5/1995 |
| DE | 19650929 | 6/1998 |
| DE | 19734843 | 2/1999 |
| DE | 19745460 | 4/1999 |
| DE | 19814609 | 10/1999 |
| DE | 10054287 | 5/2002 |
| DE | 10228494 A1 | 1/2004 |
| DE | 10230457 A1 | 1/2004 |
| DE | 10320930 | 11/2004 |
| DE | 10343571 A1 | 4/2005 |
| DE | 102004019157 | 11/2005 |
| DE | 102004061088 | 6/2006 |
| DE | 102005019389 | 11/2006 |
| DE | 4224866 B4 | 1/2007 |
| DE | 102005062462 A1 | 6/2007 |
| DE | 102006057024 | 6/2008 |
| DE | 102007030169 | 1/2009 |
| DE | 102007051549 | 4/2009 |
| DE | 102008042516 | 5/2009 |
| DE | 102008001045 | 10/2009 |
| DE | 102008021457 | 11/2009 |
| DE | 102008002447 | 12/2009 |
| DE | 102008049269 | 4/2010 |
| DE | 102008049270 | 4/2010 |
| DE | 102009000483 | 4/2010 |
| DE | 102009001025 | 8/2010 |
| DE | 102010012983 | 2/2011 |
| DE | 102009029469 | 3/2011 |
| DE | 102009029470 | 3/2011 |
| DE | 102009048212 | 4/2011 |
| DE | 102010016348 | 4/2011 |
| DE | 102010041152 A1 | 5/2011 |
| DE | 102010003269 | 9/2011 |
| DE | 202011005213 | 9/2011 |
| DE | 202011100429 | 9/2011 |
| DE | 102010003645 | 10/2011 |
| DE | 102010028102 | 10/2011 |
| DE | 102010029107 | 11/2011 |
| DE | 102010030880 | 1/2012 |
| DE | 102010039526 | 2/2012 |
| EP | 0594451 | 4/1994 |
| EP | 0633170 | 1/1995 |
| EP | 0665143 A1 | 8/1995 |
| EP | 0683703 | 11/1995 |
| EP | 0695246 | 2/1996 |
| EP | 0749378 | 12/1996 |
| EP | 0757636 | 2/1997 |
| EP | 0760761 | 3/1997 |
| EP | 0777594 | 6/1997 |
| EP | 0792704 | 9/1997 |
| EP | 0810936 | 12/1997 |
| EP | 0828638 | 3/1998 |
| EP | 0841229 | 5/1998 |
| EP | 0847346 | 6/1998 |
| EP | 0847347 | 6/1998 |
| EP | 0853561 | 7/1998 |
| EP | 0853563 | 7/1998 |
| EP | 0853565 | 7/1998 |
| EP | 0885791 A1 | 12/1998 |
| EP | 0914269 | 5/1999 |
| EP | 0926028 | 6/1999 |
| EP | 0930991 | 7/1999 |
| EP | 0935546 | 8/1999 |
| EP | 0943511 | 9/1999 |
| EP | 1022202 | 7/2000 |
| EP | 1037778 | 9/2000 |
| EP | 0783998 | 10/2000 |
| EP | 1056628 | 12/2000 |
| EP | 1098795 | 5/2001 |
| EP | 1098796 | 5/2001 |
| EP | 1109706 | 6/2001 |
| EP | 1119475 | 8/2001 |
| EP | 1119476 | 8/2001 |
| EP | 1178907 | 2/2002 |
| EP | 1197406 | 4/2002 |
| EP | 1243489 | 9/2002 |
| EP | 1247707 | 10/2002 |
| EP | 1257445 | 11/2002 |
| EP | 1289804 | 3/2003 |
| EP | 1289806 | 3/2003 |
| EP | 1294596 | 3/2003 |
| EP | 1337420 | 8/2003 |
| EP | 1412235 | 4/2004 |
| EP | 1017514 | 6/2004 |
| EP | 1425204 | 6/2004 |
| EP | 1436179 A1 | 7/2004 |
| EP | 1448414 | 8/2004 |
| EP | 1462327 | 9/2004 |
| EP | 1485279 | 12/2004 |
| EP | 1494901 | 1/2005 |
| EP | 1494902 | 1/2005 |
| EP | 1501710 | 2/2005 |
| EP | 1519862 | 4/2005 |
| EP | 1547883 | 6/2005 |
| EP | 1612113 | 1/2006 |
| EP | 1312522 | 4/2006 |
| EP | 1666319 | 6/2006 |
| EP | 1708911 A1 | 10/2006 |
| EP | 1719673 | 11/2006 |
| EP | 1733939 | 12/2006 |
| EP | 1740424 | 1/2007 |
| EP | 1744940 | 1/2007 |
| EP | 1753646 | 2/2007 |
| EP | 1758772 | 3/2007 |
| EP | 1769987 | 4/2007 |
| EP | 1792794 | 6/2007 |
| EP | 1799518 | 6/2007 |
| EP | 1800977 | 6/2007 |
| EP | 1800978 | 6/2007 |
| EP | 1833708 A1 | 9/2007 |
| EP | 1846274 | 10/2007 |
| EP | 1849666 A1 | 10/2007 |
| EP | 1937524 A1 | 7/2008 |
| EP | 2015971 | 1/2009 |
| EP | 2050638 | 4/2009 |
| EP | 2079617 | 7/2009 |
| EP | 2109557 | 10/2009 |
| EP | 2113432 | 11/2009 |
| EP | 2127969 | 12/2009 |
| EP | 2134576 | 12/2009 |
| EP | 2138363 A1 | 12/2009 |
| EP | 2143603 | 1/2010 |
| EP | 2146877 | 1/2010 |
| EP | 2177406 A2 | 4/2010 |
| EP | 2230140 | 9/2010 |
| EP | 2236364 A1 | 10/2010 |
| EP | 2236366 | 10/2010 |
| EP | 2253520 | 11/2010 |
| EP | 2258592 | 12/2010 |
| EP | 1559623 | 1/2011 |
| EP | 2300283 A1 | 3/2011 |
| EP | 2321160 | 5/2011 |
| EP | 2338747 | 6/2011 |
| EP | 2426017 | 3/2012 |

(56) References Cited

FOREIGN PATENT DOCUMENTS

| | | |
|---|---|---|
| EP | 002088146-0001 A1 | 8/2012 |
| EP | 002088146-0002 A1 | 8/2012 |
| EP | 2532558 A2 | 12/2012 |
| EP | 2551157 A1 | 1/2013 |
| EP | 2560847 A1 | 2/2013 |
| EP | 2571733 A1 | 3/2013 |
| EP | 2578458 A1 | 4/2013 |
| EP | 2421729 B1 | 3/2014 |
| EP | 2781416 A1 | 9/2014 |
| EP | 2817183 A1 | 12/2014 |
| EP | 2817184 A1 | 12/2014 |
| EP | 002674887-0001 A1 | 2/2015 |
| EP | 2969671 A1 | 1/2016 |
| FR | 2437959 A1 | 4/1980 |
| FR | 2736025 A1 | 1/1997 |
| FR | 2738201 A1 | 3/1997 |
| FR | 2747976 | 10/1997 |
| FR | 2804392 A1 | 8/2001 |
| FR | 2879987 | 6/2006 |
| FR | 2957877 | 9/2011 |
| GB | 1395918 | 5/1975 |
| GB | 1405579 | 9/1975 |
| GB | 2188672 | 10/1987 |
| GB | 2220844 A | 1/1990 |
| GB | 2324237 | 10/1998 |
| GB | 2348118 A | 9/2000 |
| HK | 1110560 | 5/2010 |
| HK | 1105928 | 8/2010 |
| HK | 1108573 | 10/2011 |
| HK | 1110561 | 7/2012 |
| JP | 60092136 A | 5/1985 |
| JP | 0374242 A | 3/1991 |
| JP | 3572527 B2 | 10/2004 |
| JP | 2008037388 A | 2/2008 |
| KR | 10-089115 | 2/2009 |
| KR | 10-0891195 B1 | 4/2009 |
| KR | 20120029616 A | 3/2012 |
| MX | 169141 | 6/1993 |
| MX | 9708272 | 8/1998 |
| MX | 9708273 | 8/1998 |
| MX | PA03010189 | 3/2004 |
| MX | PA03010190 | 3/2004 |
| MX | PA05002760 | 6/2005 |
| MX | PA05002988 | 6/2005 |
| MX | PA05008266 | 9/2005 |
| MX | PA05005581 | 11/2005 |
| MX | PA06008594 | 8/2006 |
| MX | 2007007828 | 7/2007 |
| MX | 2007007829 | 7/2007 |
| MX | 2008012325 | 10/2008 |
| MX | 2008013480 | 10/2008 |
| MX | 2008013814 | 12/2008 |
| MX | 2008014163 | 2/2009 |
| MX | 2009013050 | 1/2010 |
| MX | 2009013051 | 1/2010 |
| MX | 2010009333 | 10/2010 |
| MX | 2011000597 | 3/2011 |
| MX | 2011000598 | 3/2011 |
| MX | 2011003242 | 4/2011 |
| MX | 2011003243 | 4/2011 |
| MX | 2011003911 | 9/2011 |
| MX | 2012002314 | 6/2012 |
| MX | 2013002710 | 5/2013 |
| MX | 2013006881 | 7/2013 |
| MX | 2014001106 A | 3/2014 |
| MX | 2013011449 A | 6/2014 |
| MX | 2013006260 A | 7/2014 |
| MX | 2014001162 A | 7/2014 |
| MX | 2014001161 A | 11/2014 |
| MX | 2014010123 A | 11/2014 |
| MX | 2014010122 A | 5/2015 |
| MX | 2015013210 A | 12/2015 |
| MY | 122308 | 4/2006 |
| MY | 122563 | 4/2006 |
| MY | 128028 | 1/2007 |
| MY | 128970 | 3/2007 |
| PT | 1800978 | 5/2011 |
| PT | 1800977 | 1/2012 |
| RU | 2238198 | 10/2004 |
| RU | 2251500 | 5/2005 |
| RU | 2260527 | 9/2005 |
| RU | 2260528 | 9/2005 |
| RU | 2268176 | 1/2006 |
| RU | 2271287 | 3/2006 |
| RU | 2293034 | 2/2007 |
| RU | 2294291 | 2/2007 |
| RU | 2007127898 | 1/2009 |
| RU | 80415 | 2/2009 |
| RU | 2346834 | 2/2009 |
| RU | 2369500 | 10/2009 |
| RU | 2381120 | 2/2010 |
| RU | 2394706 | 7/2010 |
| RU | 2416536 C1 | 4/2011 |
| RU | 105237 | 6/2011 |
| RU | 108350 | 9/2011 |
| RU | 108741 | 9/2011 |
| RU | 2456180 C2 | 7/2012 |
| RU | 2493033 C2 | 9/2013 |
| RU | 2526773 C2 | 8/2014 |
| RU | 2543448 C2 | 2/2015 |
| RU | 2560217 C2 | 8/2015 |
| RU | 2560954 C2 | 8/2015 |
| RU | 2561173 C2 | 8/2015 |
| RU | 2577830 C1 | 3/2016 |
| RU | 2577981 C1 | 3/2016 |
| RU | 2578001 C2 | 3/2016 |
| RU | 2015144362 A | 4/2017 |
| TW | M404153 U1 | 5/2011 |
| TW | 201325952 | 7/2013 |
| TW | 201325953 | 7/2013 |
| WO | WO 81/03308 | 11/1981 |
| WO | WO 91/06451 | 5/1991 |
| WO | WO 92/06869 | 4/1992 |
| WO | WO 97/12787 | 4/1997 |
| WO | WO 98/01328 | 1/1998 |
| WO | WO 98/01329 | 1/1998 |
| WO | WO 98/50261 | 11/1998 |
| WO | WO 98/51203 | 11/1998 |
| WO | WO 98/51550 | 11/1998 |
| WO | WO 99/08818 | 2/1999 |
| WO | WO 99/15382 | 4/1999 |
| WO | WO 99/56992 | 11/1999 |
| WO | WO 00/05111 | 2/2000 |
| WO | WO 00/06431 | 2/2000 |
| WO | WO 00/21808 | 4/2000 |
| WO | WO 00/21809 | 4/2000 |
| WO | WO 00/21811 | 4/2000 |
| WO | WO 00/38963 | 7/2000 |
| WO | WO 00/38964 | 7/2000 |
| WO | WO 00/53470 | 9/2000 |
| WO | WO 0061409 | 10/2000 |
| WO | WO 01/26942 | 4/2001 |
| WO | WO 01/30618 | 5/2001 |
| WO | WO 01/40034 | 6/2001 |
| WO | WO 01/49537 | 7/2001 |
| WO | WO 01/58732 | 8/2001 |
| WO | WO 01/62559 | 8/2001 |
| WO | WO 01/89890 | 11/2001 |
| WO | WO 01/89891 | 11/2001 |
| WO | WO 01/89892 | 11/2001 |
| WO | WO 01/94166 | 12/2001 |
| WO | WO 02/04168 | 1/2002 |
| WO | WO 02/04266 | 1/2002 |
| WO | WO 02/04267 | 1/2002 |
| WO | WO 02/04268 | 1/2002 |
| WO | WO 02/34590 | 5/2002 |
| WO | WO 02/34596 | 5/2002 |
| WO | WO 02/34597 | 5/2002 |
| WO | WO 02/40328 | 5/2002 |
| WO | WO 02/40329 | 5/2002 |
| WO | WO 02/051677 | 7/2002 |
| WO | WO 02/052917 | 7/2002 |
| WO | WO 02/066301 | 8/2002 |
| WO | WO 02/090155 | 11/2002 |

(56) References Cited

FOREIGN PATENT DOCUMENTS

| | | |
|---|---|---|
| WO | WO 02/090156 | 11/2002 |
| WO | WO 03/026938 | 4/2003 |
| WO | WO 03/033316 | 4/2003 |
| WO | WO 03/042017 | 5/2003 |
| WO | WO 03/045746 | 6/2003 |
| WO | WO 03/091078 | 11/2003 |
| WO | WO 03/101794 | 12/2003 |
| WO | WO 03/106233 | 12/2003 |
| WO | WO 2004/002792 | 1/2004 |
| WO | WO 2004/045927 | 6/2004 |
| WO | WO 2004/045928 | 6/2004 |
| WO | WO 2004/048163 | 6/2004 |
| WO | WO 2004/056625 | 7/2004 |
| WO | WO 2004/069617 | 8/2004 |
| WO | WO 2004/076251 | 9/2004 |
| WO | WO 2004/098962 | 11/2004 |
| WO | WO 2004/098963 | 11/2004 |
| WO | WO 2004/110833 | 12/2004 |
| WO | WO 2005/025956 | 3/2005 |
| WO | WO 2005/039944 | 5/2005 |
| WO | WO 2008/051483 | 5/2005 |
| WO | WO 2005/054017 | 6/2005 |
| WO | WO 2005/080160 | 9/2005 |
| WO | WO 2005/082691 | 9/2005 |
| WO | WO 2005/087560 | 9/2005 |
| WO | WO 2005/092680 | 10/2005 |
| WO | WO 2005/102801 | 11/2005 |
| WO | WO 2005/115813 | 12/2005 |
| WO | WO 2005/123471 | 12/2005 |
| WO | WO 2006/000393 | 1/2006 |
| WO | WO 2006/013152 | 2/2006 |
| WO | WO 2006/040259 | 4/2006 |
| WO | WO 2006/048355 | 5/2006 |
| WO | WO 2006/061284 | 6/2006 |
| WO | WO 2006/069648 | 7/2006 |
| WO | WO 2006/074995 | 7/2006 |
| WO | WO 2006/079591 | 8/2006 |
| WO | WO 2006/081893 | 8/2006 |
| WO | WO 2006/106006 | 10/2006 |
| WO | WO 2006/106109 | 10/2006 |
| WO | 2006119679 A1 | 11/2006 |
| WO | WO 2006/114355 | 11/2006 |
| WO | WO 2006/117081 | 11/2006 |
| WO | WO 2006/117085 | 11/2006 |
| WO | WO 2006/117308 | 11/2006 |
| WO | WO 2007/009885 | 1/2007 |
| WO | WO 2007/014389 | 2/2007 |
| WO | WO 2007/014395 | 2/2007 |
| WO | WO 2007/035288 | 3/2007 |
| WO | WO 2007/042377 | 4/2007 |
| WO | WO 2007/045549 | 4/2007 |
| WO | WO 2007/071487 | 6/2007 |
| WO | WO 2007/073974 | 7/2007 |
| WO | WO 2007/102404 | 9/2007 |
| WO | WO 2007/122095 | 11/2007 |
| WO | WO 2007/128677 | 11/2007 |
| WO | WO 2008/003633 | 1/2008 |
| WO | WO 2008/043622 | 4/2008 |
| WO | WO 2008/076402 | 6/2008 |
| WO | WO 2008/122453 | 10/2008 |
| WO | WO 2008/124113 | 10/2008 |
| WO | WO 2008/135308 | 11/2008 |
| WO | WO 2009/000498 | 12/2008 |
| WO | WO 2009/115494 | 9/2009 |
| WO | WO 2009/121849 | 10/2009 |
| WO | WO 2009/124792 | 10/2009 |
| WO | WO 2009/132982 | 11/2009 |
| WO | WO 2009/153097 | 12/2009 |
| WO | WO 2009/155230 | 12/2009 |
| WO | WO 2010/016000 | 2/2010 |
| WO | WO 2010/028866 | 3/2010 |
| WO | WO 2010/028918 | 3/2010 |
| WO | WO 2010033646 | 3/2010 |
| WO | WO 2010/034445 | 4/2010 |
| WO | WO 2010/034447 | 4/2010 |
| WO | WO 2010/035794 | 4/2010 |
| WO | WO 2010/091757 | 8/2010 |
| WO | WO 2010/098877 | 9/2010 |
| WO | WO 2010/112579 | 10/2010 |
| WO | WO 2010/121665 | 10/2010 |
| WO | 2010127888 A1 | 11/2010 |
| WO | WO 2011/032753 | 3/2011 |
| WO | WO 2011/032760 | 3/2011 |
| WO | WO 2011/040743 | 4/2011 |
| WO | WO 2011/060979 | 5/2011 |
| WO | WO 2011/116995 | 9/2011 |
| WO | WO 2011/120723 | 10/2011 |
| WO | WO 2011/124404 | 10/2011 |
| WO | WO 2011/131395 | 10/2011 |
| WO | WO 2011/144400 | 11/2011 |
| WO | WO 2011/157465 | 12/2011 |
| WO | WO 2012/001175 | 1/2012 |
| WO | WO 2012/014054 | 2/2012 |
| WO | WO 2012/033363 | 3/2012 |
| WO | 2013/016493 A1 | 1/2013 |
| WO | 2013/019645 A1 | 2/2013 |
| WO | 2013/019723 A1 | 2/2013 |
| WO | 2013089312 A1 | 6/2013 |
| WO | 2013/126907 A1 | 8/2013 |
| WO | 2013/126910 A1 | 8/2013 |
| WO | 13176352 A1 | 11/2013 |
| WO | 2014/145538 A1 | 9/2014 |
| WO | 2016/160687 A1 | 10/2016 |
| WO | 2017/075066 A1 | 5/2017 |
| WO | 2017/201458 A1 | 11/2017 |
| WO | 2017/201464 A1 | 11/2017 |
| WO | 2017/201470 A1 | 11/2017 |
| WO | 2017/201473 A1 | 11/2017 |
| WO | 2017/201485 A1 | 11/2017 |
| ZA | 200006220 B | 7/2001 |

OTHER PUBLICATIONS

Non-Final Rejection towards U.S. Appl. No. 13/453,601 dated Jan. 10, 2014.
Final Rejection towards U.S. Appl. No. 13/453,601 dated Aug. 1, 2014.
Non-Final Rejection towards U.S. Appl. No. 13/453,601 dated Feb. 4, 2015.
Final Rejection towards U.S. Appl. No. 13/453,601 dated Jun. 3, 2015.
Non-Final Rejection towards U.S. Appl. No. 13/453,601 dated Jan. 8, 2016.
Notice of Allowance towards U.S. Appl. No. 13/453,601 dated May 20, 2016.
Non-Final Rejection towards U.S. Appl. No. 13/558,624 dated May 16, 2014.
Final Rejection towards U.S. Appl. No. 13/558,624 dated Sep. 29, 2014.
Non-Final Rejection towards U.S. Appl. No. 13/558,624 dated Mar. 6, 2015.
Notice of Allowance towards U.S. Appl. No. 13/558,624 dated Jun. 29, 2015.
Non-Final Rejection towards U.S. Appl. No. 13/560,585 dated Jul. 29, 2014.
Final Rejection towards U.S. Appl. No. 13/560,585 dated Jan. 28, 2015.
Non-Final Rejection towards U.S. Appl. No. 13/560,585 dated Jun. 24, 2015.
Notice of Allowance towards U.S. Appl. No. 13/560,585 dated Mar. 22, 2016.
Non-Final Rejection towards U.S. Appl. No. 13/679,646 dated Feb. 2, 2015.
Final Rejection towards U.S. Appl. No. 13/679,646 dated Sep. 2, 2015.
Non-Final Rejection towards U.S. Appl. No. 13/679,646 dated Jun. 13, 2016.
Non-Final Rejection towards U.S. Appl. No. 13/679,646 dated Jan. 4, 2017.

(56) References Cited

OTHER PUBLICATIONS

Non-Final Rejection towards U.S. Appl. No. 13/572,100 dated Jun. 3, 2014.
Non-Final Rejection towards U.S. Appl. No. 13/587,389 dated Oct. 31, 2014.
Final Rejection towards U.S. Appl. No. 13/587,389 dated Feb. 25, 2015.
Notice of Allowance towards U.S. Appl. No. 13/587,389 dated Jun. 19, 2015.
Non-Final Rejection towards U.S. Appl. No. 14/928,467 dated Apr. 28, 2016.
Final Rejection towards U.S. Appl. No. 14/928,467 dated Sep. 14, 2016.
Non-Final Rejection towards U.S. Appl. No. 13/194,070 dated Apr. 8, 2013.
Final Rejection towards U.S. Appl. No. 13/194,070 dated Aug. 27, 2013.
Non-Final Rejection towards U.S. Appl. No. 13/194,070 dated Dec. 26, 2013.
Notice of Allowance towards U.S. Appl. No. 13/194,070 dated Apr. 18, 2014.
Non-Final Rejection towards U.S. Appl. No. 14/329,423 dated Sep. 10, 2014.
Notice of Allowance towards U.S. Appl. No. 14/329,423 dated Apr. 15, 2015.
Non-Final Rejection towards U.S. Appl. No. 29/413,428 dated Nov. 7, 2012.
Notice of Allowance towards U.S. Appl. No. 29/413,428 dated Jun. 14, 2013.
Notice of Allowance towards U.S. Appl. No. 29/413,430 dated Nov. 26, 2012.
Non-Final Rejection towards U.S. Appl. No. 29/375,477 dated Sep. 7, 2012.
Notice of Allowance towards U.S. Appl. No. 29/375,477 dated Jan. 15, 2014.
Notice of Allowance towards U.S. Appl. No. 29/429,262 dated Jun. 27, 2013.
Non-Final Rejection towards U.S. Appl. No. 14/035,610 dated Apr. 22, 2016.
Final Rejection towards U.S. Appl. No. 14/035,610 dated Aug. 5, 2016.
Non-Final Rejection towards U.S. Appl. No. 14/035,610 dated Dec. 30, 2016.
Non-Final Rejection towards U.S. Appl. No. 13/776,376 dated Nov. 18, 2014.
Non-Final Rejection towards U.S. Appl. No. 13/840,256 dated Nov. 26, 2014.
Non-Final Rejection towards U.S. Appl. No. 14/715,180 dated Jan. 7, 2016.
Final Rejection towards U.S. Appl. No. 14/715,180 dated Aug. 16, 2016.
Definition of rectangular in Oxford Dictionary 2017.
Non-Final Rejection towards U.S. Appl. No. 14/715,180 dated May 22, 2017.
Non-Final Rejection towards U.S. Appl. No. 14/721,476 dated May 16, 2017.
International Search Report and Written Opinion issued in PCT Application No. PCT/US2013/027684 dated Apr. 29, 2013.
International Search Report and Written Opinion issued in PCT Application No. PCT/US2014/030329 dated Jun. 3, 2014.
First Office Action issued in connection with CA Application No. 2865292 dated Aug. 25, 2015.
International Search Report and Written Opinion issued in PCT Application No. PCT/US2013/027688 dated Apr. 25, 2013.
First Office Action issued in connection with CA Application No. 2865295 dated Aug. 25, 2015.
Non-Final Rejection towards U.S. Appl. No. 14/216,082 dated Apr. 12, 2017.
Non-Final Rejection towards U.S. Appl. No. 14/200,792 dated Oct. 23, 2015.
Final Rejection towards U.S. Appl. No. 14/200,792 dated Feb. 23, 2016.
Notice of Allowance issued towards U.S. Appl. No. 14/200,792 dated Jul. 22, 2016.
Non-Final Rejection towards U.S. Appl. No. 15/359,271 dated May 11, 2017.
Notice of Allowance issued towards U.S. Appl. No. 29/504,287 dated Sep. 12, 2016.
Non-Final Rejection towards U.S. Appl. No. 29/504,292 dated Jun. 19, 2015.
Final Rejection towards U.S. Appl. No. 29/504,292 dated Jan. 20, 2016.
Advisory Action towards U.S. Appl. No. 29/504,292 dated May 19, 2016.
Notice of Allowance issued towards U.S. Appl. No. 29/504,292 dated Aug. 16, 2016.
International Search Report and Written Opinion issued in PCT Application No. PCT/US2016/024490 dated Jun. 21, 2016.
Notice of Allowance issued towards U.S. Appl. No. 29/525,746 dated Apr. 7, 2016.
Notice of Allowance issued towards U.S. Appl. No. 29/571,419 dated Jan. 31, 2017.
Notice of Allowance issued towards U.S. Appl. No. 29/571,424 dated Feb. 1, 2017.
International Search Report and Written Opinion issued in PCT Application No. PCT/US2016/058887 dated Jan. 3, 2017.
International Search Report dated Oct. 19, 2012 for PCT/US2012/048843 filed Jul. 30, 2012.
International Search Report dated Sep. 19, 2012 for PCT/US2012/048617 filed Jul. 27, 2012.
International Search Report dated Sep. 19, 2012 for PCT/US2012/048262 filed Jul. 26, 2012.
Naedele, M., "An Access Control Protocol for Embedded Devices," Industrial Informatics, 2006 IEEE International Conference on IEEE, PI, dated Aug. 1, 2006, Retrieved from the Internet URL: http://ieeexplore.ieee.org/document/4053450/, pp. 565-569.
"DuPont Wiper Blade Installation: Trapezoid Arm Style," Pylon Manufacturing Corp., dated Jan. 1, 2015, Retrieved from the Internet URL: http://http://windshield-wiperblades.com/resources?do=installation_removal&country=United%20States#, on Jul. 28, 2017, pp. 1-2.
"First Time Fit Wiper Blades: Top Lock 1 Connector Wiper Blade Installation Instructions" DENSO Auto Parts, Retrieved from the Internet URL: http://densoautoparts.com/wiper-blades-first-time-fit-wiper-blades.aspx#undefined, on Jul. 28, 2017, pp. 1-3.
Final Rejection towards U.S. Appl. No. 13/679,646 dated Jul. 14, 2017.
Office Action issued in connection with EP Application No. 12171721.9 dated Aug. 16, 2017.
Non-Final Rejection towards U.S. Appl. No. 14/715,144 dated Nov. 15, 2017.
International Search Report and Written Opinion issued in PCT Application No. PCT/US2017/033622 dated Aug. 11, 2017.
International Search Report and Written Opinion issued in PCT Application No. PCT/US2017/033629 dated Aug. 22, 2017.
International Search Report and Written Opinion issued in PCT Application No. PCT/US2017/033640 dated Aug. 23, 2017.
International Search Report and Written Opinion issued in PCT Application No. PCT/US2017/033657 dated Sep. 28, 2017.
International Search Report and Written Opinion issued in PCT Application No. PCT/US2017/033643 dated Oct. 2, 2017.
Second Office Action issued in connection with CA Application No. 2865292 dated Aug. 15, 2016.
Non-Final Rejection towards U.S. Appl. No. 13/776,383 dated Mar. 10, 2015.
Final Rejection towards U.S. Appl. No. 13/776,383 dated Aug. 14, 2015.

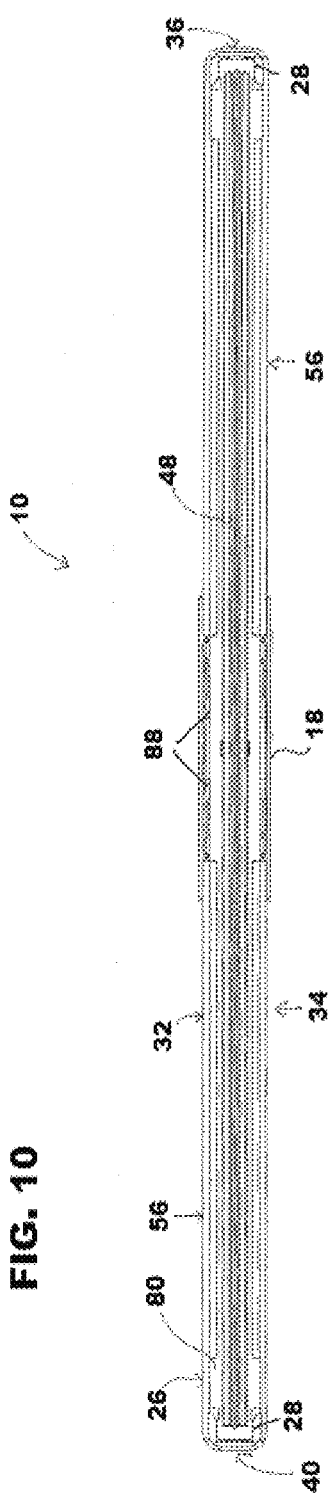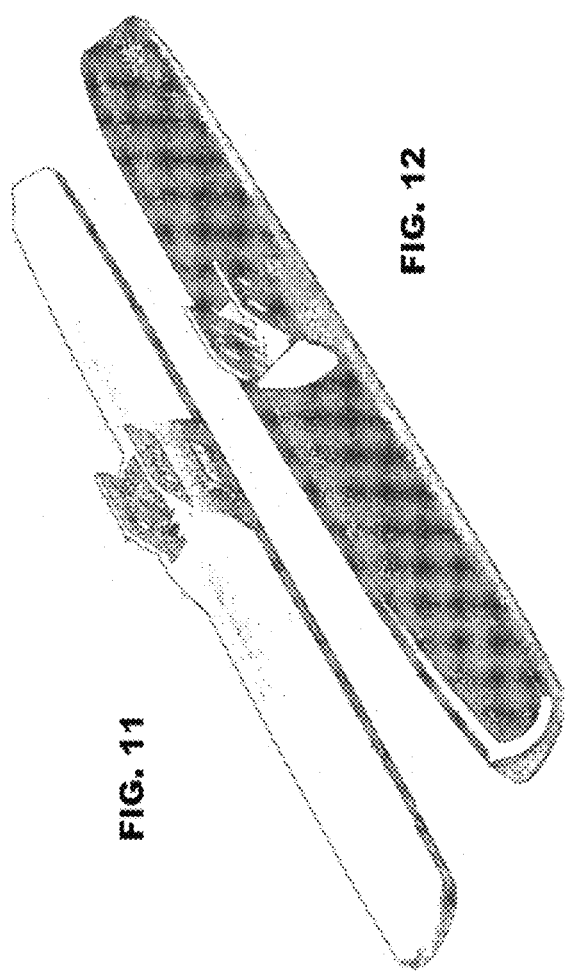
FIG. 10
FIG. 11
FIG. 12

VORTEX DAMPING WIPER BLADE

CROSS REFERENCE TO RELATED APPLICATIONS

This application is a continuation of U.S. application Ser. No. 13/453,601 filed on Apr. 23, 2012, which claims the benefit of U.S. Provisional Application No. 61/477,908 filed Apr. 21, 2011, the entire contents of which are hereby incorporated herein by reference in its entirety.

FIELD OF THE INVENTION

This invention relates to the field of windshield wiper blades.

BACKGROUND

Typical wiper blades used on vehicles are plagued with numerous persistent drawbacks. Among these drawbacks are two common and interrelated drawbacks are of interest. The first such drawback is wiper blade separation from the surface of the windshield. The second such drawback is wind noise generated by the air moving over the wiper blade as a vehicle travels at speed.

One persistent cause of wiper blade separation from the windshield is the lack of sufficient downward force from the wiper blade onto the windshield. A major contributing factor to insufficient downward force involves wind lift. That is, wind passing over the windshield creates a "lifting" force which may cause the wiper blade to lose partial or complete contact with the surface of the windshield, and thus result in uneven or inconsistent clearing of water off the windshield. The wind lift problem has been known in the wiper field for decades, and many attempts have been made to resolve it. For example, see U.S. Pat. Nos. 3,056,991, 3,317,945, 3,879,793, 3,942,212, 6,292,974, 6,944,905, which are incorporated herein by reference in their entirety.

One common solution to the wind lift problem is to add a wind deflection structure, or spoiler, to the top of the wiper blade. On a beam blade, a spoiler is generally affixed to the top of the wiper blade, thereby substantially increasing the height and outer cross-section of the wiper blade overall, and increasing the need for an anti wind-lift structure. Moreover, for cost and ease of manufacture reasons, these spoilers have a uniform cross-sectional profile across the entire length, or substantially the entire length of the wiper blade structure. U.S. Pat. No. 6,944,905, for instance describes a uniformly shaped spoiler, except for the end sections, in which a wall and abrupt corner are used at the end of the wind deflection strip, slanting down to the end of the blade.

Another problem associated with wiper blades is that wind noise generated as a wiper blade is used while the vehicle travels at higher speeds. In general, undesirable wind noise from wiper blades originates in part from air vortices formed by wind contacting a wiper blade. In normal operation, as wind flows over a wiper blade, an air vortex forms behind the wiper blade, that is, on the leeward side of the wiper blade. Moreover, the size of the vortex is proportional to the height of the wiper blade, from its contact point with the windshield to the top of its cross-sectional profile. Thus, a wiper blade with a larger wind deflection structure generates a larger vortex, and therefore more noise.

Generally, wind noise is created as a wiper blade enters a slip stream of wind above the windshield. The wind noise created from wiper blades encountering the slip stream is distracting and makes for a less comfortable overall driving experience. Reduction of such wind noise is therefore a constant concern associated with wiper blade design.

Wiper blade separation from the windshield is a primary concern in wiper blade design because of potential safety hazards that can arise out of poor wiping performance. However, a wiper blade designer should also attempt to minimize the amount of noise caused by the design of the wiper blade in order to allow for a more comfortable driving experience for the driver of the car on which the wiper blades are installed. Wiper blades currently used in the art do not adequately present a solution that addresses the wind lift problem while minimizing the amount of noise generated by the wiper blade.

BRIEF SUMMARY

The foregoing problems of prior wiper blades are resolved or at least substantially reduced and a technical advance is achieved in a low-profile wiper blade that reduces or eliminates wind-lift while damping wind noise. The present invention achieves this through a gradually decreasing-height cover attached to the surface of a wiper blade.

In certain embodiments, the invention comprises a wiper blade having a beam with two ends, two longitudinal sides, a top side and a bottom side. The wiper blade further has a central bridge disposed on the top side of the beam, a wiper strip disposed on the bottom side of the beam and a cover having two longitudinal sides, two outer ends and a top surface. The cover may be disposed on the top side of the beam, and the top surface of the cover has a base portion having a height and a raised portion having a height, wherein the height of the raised portion is greater than the height of the base portion and the height of the raised portion gradually decreases as the raised portion approaches the outer ends of the cover.

Certain embodiments of the invention are directed to a wiper blade cover comprising two longitudinal sides, two outer ends and a top surface, wherein the cover is capable of being disposed on the top side of a beam. The top surface of the wiper blade cover may have a base portion having a height and a raised portion having a height, where the height of the raised portion is greater than the height of the base portion and the height of the raised portion gradually decreases as the raised portion approaches the outer ends of the cover.

Certain embodiments of the invention are directed to a wiper blade comprising a beam having two ends, a central bridge disposed on the beam, and a cover, wherein the cover has a spoiler that tapers from a highest point in the vicinity of the central bridge to a lowest point in the vicinity of the ends of the beam.

In some embodiments where the raised portion of the cover may optionally embody a wind deflection structure that gradually recedes along the length of the cover as it approaches the ends of the wiper blade, such that the tip of the wind deflection structure is either at or near the surface of the base of the cover at the ends of the wiper blade, or has completely receded into the base of the cover before reaching the end of the wiper blade.

In embodiments where the raised portion of the cover of the beam blade does not embody a spoiler, the cover the raised portion that gradually recedes along the length of the cover as it approaches the ends of the wiper blade such that the raised portion of the cover is at or near the surface of the base of the cover, at the ends of the wiper blade, or has completely receded into the base of the cover before reaching the end of the wiper blade. In such embodiments, the raised portion of the cover is preferably curved in order to minimize the effect of the wind on that raised portion.

By gradually receding the top of the cover, whether it is a wind deflection structure or merely a raised portion, along the length of the cover as it approaches the ends of the wiper blade, the vortex formed behind the wiper blade relative to the direction of the oncoming wind is decreased along the length of the wiper blade, and approaching its ends. The decreasing profile of the cover reduces and/or dissipates the vortex, thereby reducing or eliminating the audible noise (to the driver of the vehicle) caused by the vortex.

It is notable that the portion(s) of the cover nearest the middle of the wiper blade need not be the "tallest" portions of the wiper blade. Also, the cover may be one piece, may be two pieces on either side of a connection device or mounting base attached at or near the middle of the beam, or may be made of multiple parts. In embodiments having two (or more) parts of the cover, there may be a cap, or caps, covering gaps in the cover. For instance, in an embodiment having two covers, one for each side of the wiper blade, there may be a cap which covers the inner ends of the two covers, and the connection device or mounting base.

Exemplary embodiments are attached hereto as examples of the invention, both with a wind deflection structure, and with a raised portion of the cover.

BRIEF DESCRIPTION OF THE DRAWINGS

FIG. 10 illustrates a bottom view of a second embodiment of a slim profile wiper blade of the present invention.

FIG. 11 illustrates a perspective view of a third embodiment of the invention.

FIG. 12 illustrates perspective view of a fourth embodiment of the invention.

As is apparent to persons of skill in the art FIGS. 1-12 depict the wiper blades as being flat for convenience and to show the relative relationships between the various parts. However, embodiments of the invention are preferably curved to better perform and contour to the shape of the spherical windshields found on motor vehicles. Accordingly, the scope of the invention is not intended to be limited to flat wiper blades and is intended to include curved embodiments within its scope.

DETAILED DESCRIPTION

Figure 1:
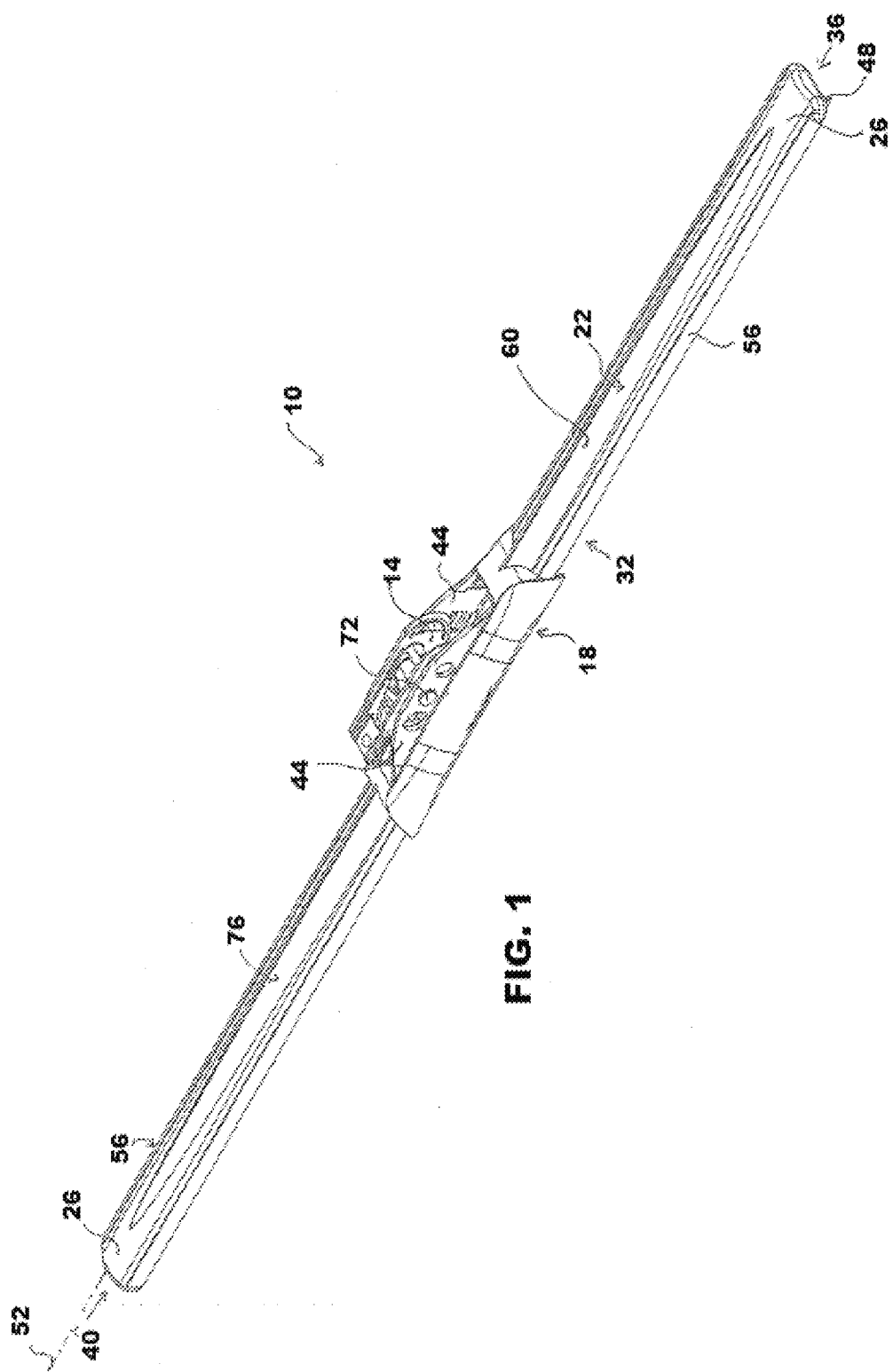
FIG. 1 illustrates a perspective view of a first embodiment of a slim profile wiper blade of the present invention.

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. The embodiments discussed below are described in sufficient detail to enable those skilled in the art to practice the subject matter disclosed herein. It is to be understood that the embodiments may be combined, or that other embodiments may be utilized, and that structural and logical variations may be made without departing from the scope of the subject matter disclosed. Accordingly, references to any particular embodiment are not intended to be interpreted as excluding the existence of additional embodiments that also incorporate the recited features. It should also be understood that the drawings are not to scale and in certain instances details have been omitted, which are not necessary for an understanding of the present invention, such as conventional details of fabrication and assembly.

In certain embodiments, the invention comprises a wiper blade having a beam with two ends, two longitudinal sides, a top side and a bottom side. The wiper blade further has a central bridge disposed on the top side of the beam, a wiper strip disposed on the bottom side of the beam and a cover having two longitudinal sides, two outer ends and a top surface. The cover may be disposed on the top side of the beam, and the top surface of the cover has a base portion having a height and a raised portion having a height, wherein the height of the raised portion is greater than the height of the base portion and the height of the raised portion gradually decreases as the raised portion approaches the outer ends of the cover.

In certain embodiments of the invention, the wiper blade may further have a raised portion that forms a wind deflection structure having a generally triangular shape when viewed in cross section. In certain embodiments of the invention, the cover of the wiper blade may be symmetric in shape across a plane that is transverse to the two longitudinal sides of the cover. In certain embodiments of the invention the cover of the wiper blade may be symmetric in shape across a plane that extends vertically through a longitudinal axis of the cover.

In certain embodiments of the invention, the raised portion of the wiper blade may have an apex that merges with the base portion before the outer ends of the cover. In certain embodiments of the invention, the cover of the wiper blade may be provided with two claws that run along the two longitudinal sides of the cover, wherein the longitudinal sides of the beam are disposed in the two claws. In some such embodiments, the claws may end in the vicinity of the outer ends of the cover, and the outer ends of the cover may be provided with a structure that secures the ends of the beam.

In certain embodiments of the invention, the cover of the wiper blade may be a unitary structure and may be provided with a hole to accommodate the central bridge of the wiper blade. In other embodiments of the invention, the cover of the wiper blade may comprises two sections, where each section has an inner end and a gap is provided between the inner ends of the two sections to accommodate the central bridge. In some such embodiments, the wiper blade may have a cap that covers the gap and the inner ends of the two sections of the cover.

Certain embodiments of the invention are directed to a wiper blade cover comprising two longitudinal sides, two outer ends and a top surface, wherein the cover is capable of being disposed on the top side of a beam. The top surface of the wiper blade cover may have a base portion having a height and a raised portion having a height, where the height of the raised portion is greater than the height of the base portion and the height of the raised portion gradually decreases as the raised portion approaches the outer ends of the cover.

In certain embodiments of the invention, the raised portion of the wiper blade cover forms a wind deflection structure having a generally triangular shape when viewed in cross-section. In certain embodiments of the invention the wiper blade cover is symmetric in shape across a plane that is transverse to the two longitudinal sides of the cover. In certain embodiments of the invention, the raised portion of the wiper blade cover may have an apex that merges with the base portion before the outer ends of the cover.

In certain embodiments of the invention, the wiper blade cover may be provided with two claws that run along the two longitudinal sides of the cover, wherein the claws are capable of receiving the longitudinal sides of a beam. In some such embodiments, the claws of the wiper blade cover may end in the vicinity of the outer ends of the cover, and the outer ends of the cover may be provided with a structure capable of securing the ends of the beam.

In certain embodiments of the invention, the wiper blade cover is a unitary structure and is provided with a hole to accommodate the central bridge of the wiper blade. In other embodiments of the invention, the wiper blade cover comprises two sections, each having an inner end, and a gap is provided between the inner ends of the two sections in order to accommodate a central bridge of a wiper blade. In some such embodiments, the wiper blade cover may further be provided with a cap that covers the gap and the inner ends of the two sections of the wiper blade cover.

Certain embodiments of the invention are directed to a wiper blade comprising a beam having two ends, a central bridge disposed on the beam, and a cover, wherein the cover has a spoiler that tapers from a highest point in the vicinity of the central bridge to a lowest point in the vicinity of the ends of the beam.

Figure 3:
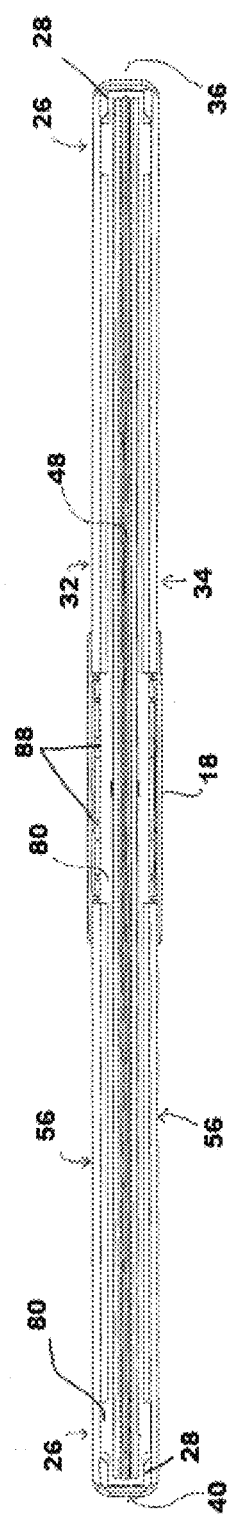
FIG. 3 illustrates a bottom view of a first embodiment of a slim profile wiper blade of the present invention.

Referring to the drawings in general, an elongate, wiper blade 10 may be slender and includes a beam (or support element) 80, a central bridge (or mounting base) 44, a cover 22, a front edge 32, a rear edge 34, opposing ends 26 having front edge 32 and rear edge 34 therebetween, a wiper strip 48 and either a tapered spoiler 60 or a tapered raised portion 61. The wiper blade 10 may optionally further comprise a connector 14. As best shown in FIG. 3, wiper blade 10 may have an outer edge or perimeter 56 formed by front edge 32, left end 40, rear edge 34, and right end 36. The front edge 32 and rear edge 34 may also be called the longitudinal sides of the wiper blade. The perimeter 56 is generally defined by a curvilinear cover 22, having either a tapered spoiler 60 or a tapered raised portion 61. The tapered spoiler 60 or tapered raised portion 61 constitute a highly effective means for damping air vortices. Connector 14, which is removably attached to the central bridge 44, secures the wiper blade 10 to a driver arm (not shown) that actuates the wiper blade 10. As is well known in the art, different kinds of connectors may be used to connect the wiper blade 10 to different wiper arms, or multi-arm connectors can be used to connect to various types of arms. Additionally, the central bridge 44 may be designed to connect to a particular type (or types) of wiper arm(s), thereby making a connector 14 unnecessary.

Figure 2:
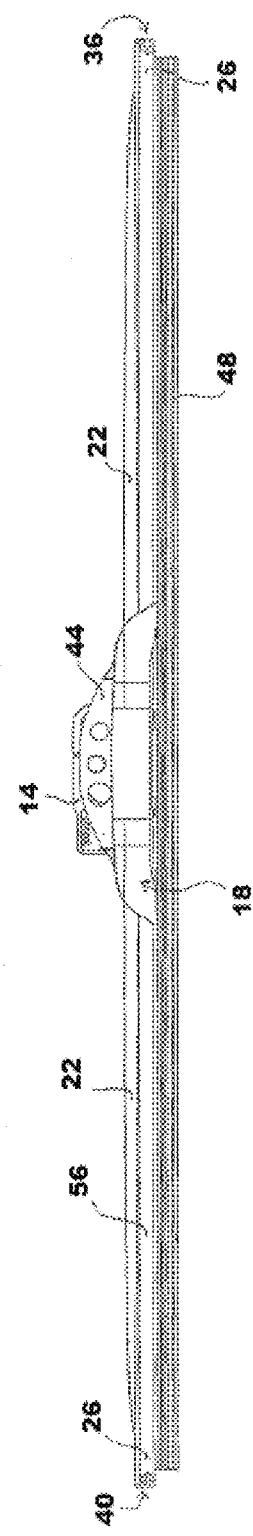
FIG. 2 illustrates a front view of a first embodiment of a slim profile wiper blade of the present invention.
Figure 4:
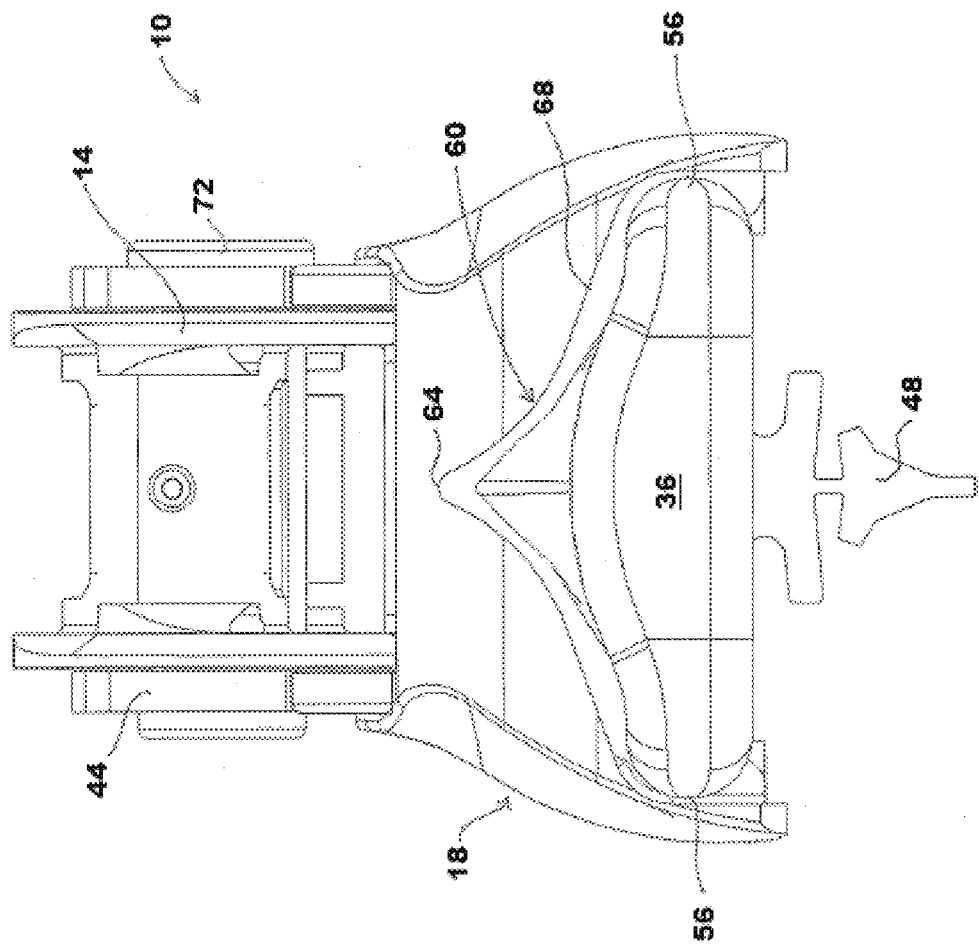
FIG. 4 illustrates a right end view of a first embodiment of a slim profile wiper blade of the present invention.
Figure 5:
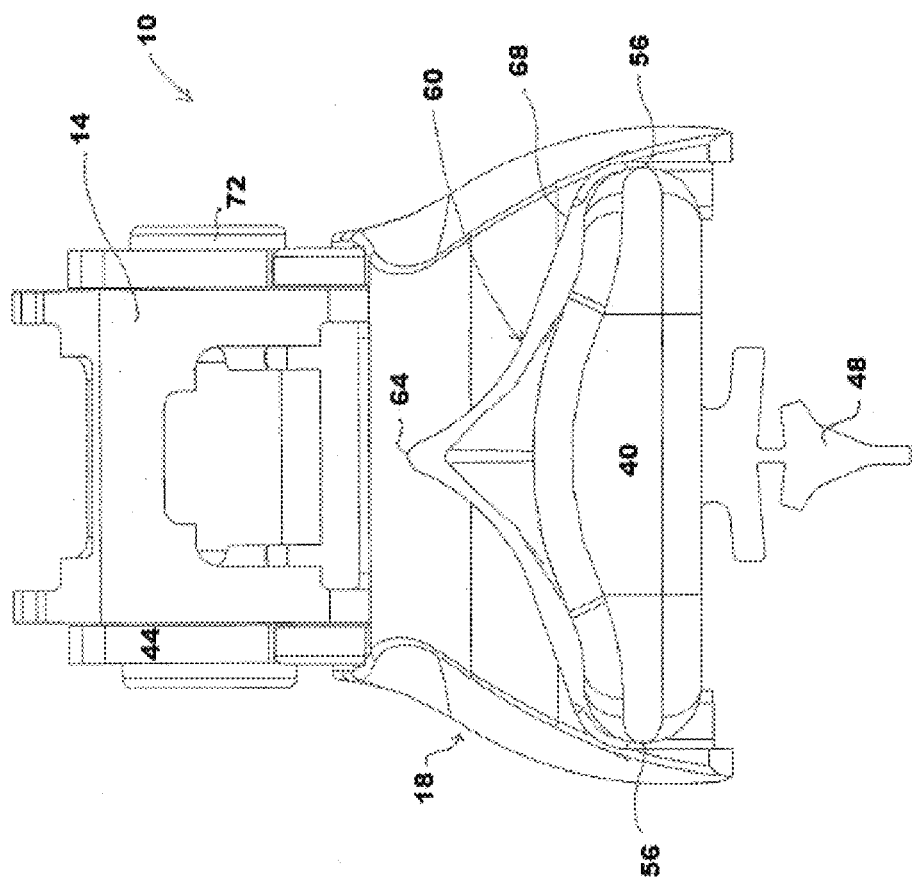
FIG. 5 illustrates a left end view of a first embodiment of a slim profile wiper blade of the present invention.

FIGS. 1-5 depict a first embodiment of the wiper blade 10 having a cover 22 with a top surface 76 with a pedestal or base region that supports and defines the outer boundary of the a raised portion that embodies a tapered spoiler 60, having a generally triangular shape when viewed in cross-section (FIGS. 4 & 5). The tapered spoiler 60 provides a curvilinear outer surface 68, best shown in FIG. 4. The tapered spoiler 60 provides a centrally elevated area most clearly defined at apex 64 (FIG. 4), which extends along axis 52 (FIG. 1). In use, the tapered spoiler 60 acts as a means for reducing wind vortices because it allows wind to pass over it with minimal or no noise effect. Specifically, the novel low-profile, longitudinally tapered design of tapered spoiler 60 provides minimized or negligible vortex at the leeward side of wiper blade 10. The tapering of the tapered spoiler 60 is gradual, and tapering downwards towards the ends of the wiper blade 36, 40. Indeed, as shown in FIGS. 1 & 2, the height of the tapered spoiler 60 may recede into the height of the base portion of the top surface of the cover 22 in the vicinity of (either before the end of or at the end of) the outer ends of the cover such that the tapered spoiler 60 merges with the base portion. Alternatively, as shown in FIG. 12, the height of the tapered spoiler may still be greater than the height of the base portion of the top surface of the cover at the ends of the cover 22.

The wiper blade 10 may also optionally further comprise a covering cap 18, which covers the gaps between the cover and the central bridge 44. As shown in FIGS. 1-5, the cover 22 may comprise two sections, each having an inner end in the vicinity of the central bridge 44. As best seen in FIG. 3, the sections of the cover 22 thereby have a gap between their respective inner ends which accommodates the central bridge. As shown in FIG. 1, the covering cap 18 covers this gap and the inner ends of the cover sections, and is provided with a hole to accommodate the central bridge 44. This covering cap may also be vertically extended to cover the connection area between wiper arm, the connector 14 (if one is used), and the central bridge 44 (not shown).

Alternatively, as shown in FIGS. 11 and 12, the cover may also be a single piece, shaped to cover the central bridge, thereby obviating the need for a covering cap 18. In such embodiments, the cover 22 is provided with a hole which can accommodate the central bridge. 44. As shown in FIGS. 11 and 12, the portion of cover 22 surrounding the central bridge 44 may cover only the connection between the beam 80 and the central bridge 44, leaving the connecting area between the central bridge 44, wiper arm and connector 14 (if any) uncovered. Alternatively, the cover 22 may extend vertically to also cover the connection area between the wiper arm, connector 14 (if one is used) and the central bridge 44 (not shown).

As shown in FIGS. 1 and 11, the tapered spoiler 60 may be located in the center of the cover, or towards the rear edge of the cover 22, and may be symmetric across the plane extending vertically through the axis 52. Alternatively, as shown in FIG. 12, the apex 64 of the tapered spoiler 61 may be nearer to one longitudinal side (such as the rear edge 34) than to the other. As shown in FIGS. 2, 11 and 12 the cover may also be symmetric across the plane that is transverse to the longitudinal sides and axis 52.

Figure 6:
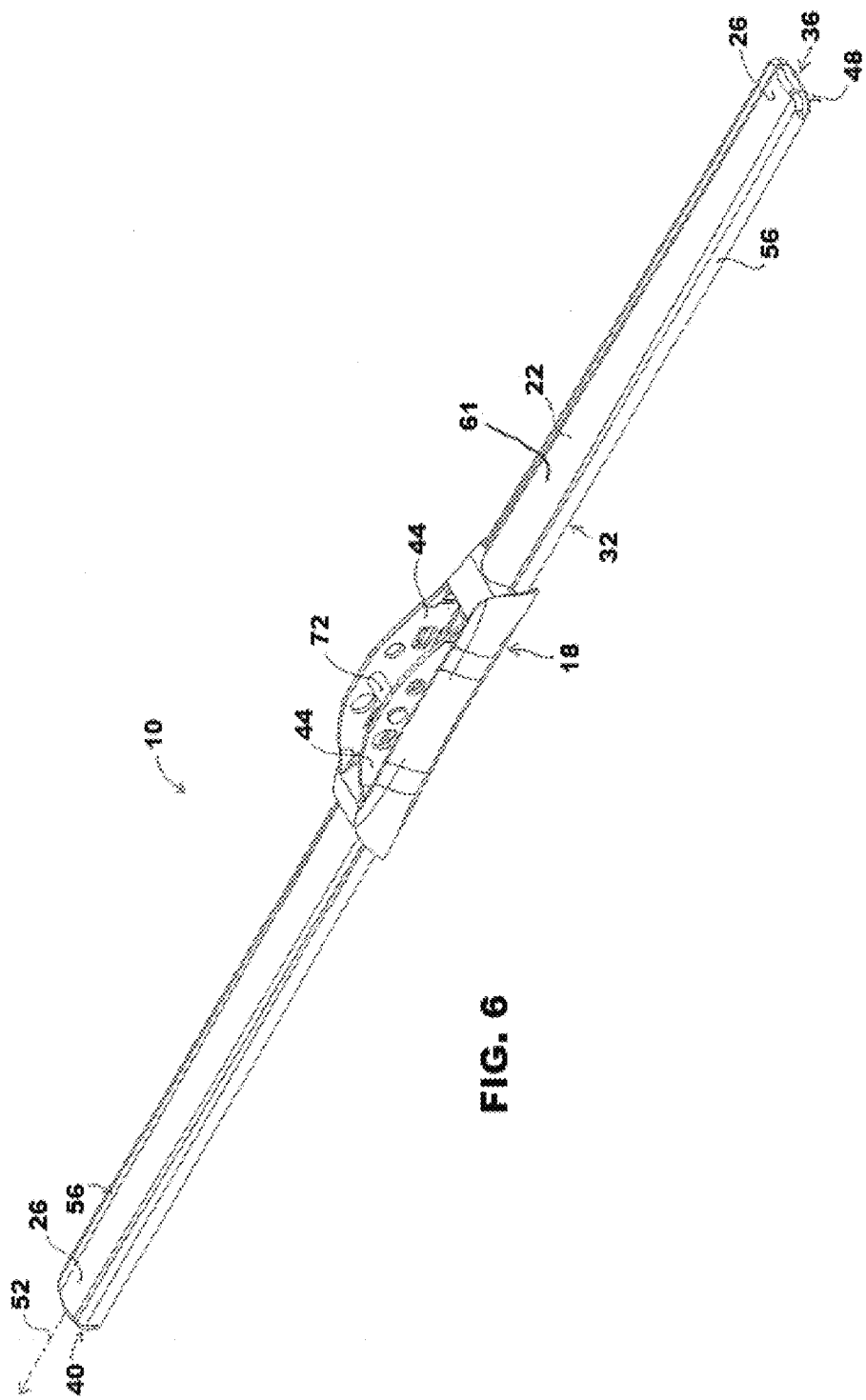
FIG. 6 illustrates a perspective view of a second embodiment of a slim profile wiper blade of the present invention.
Figure 7:
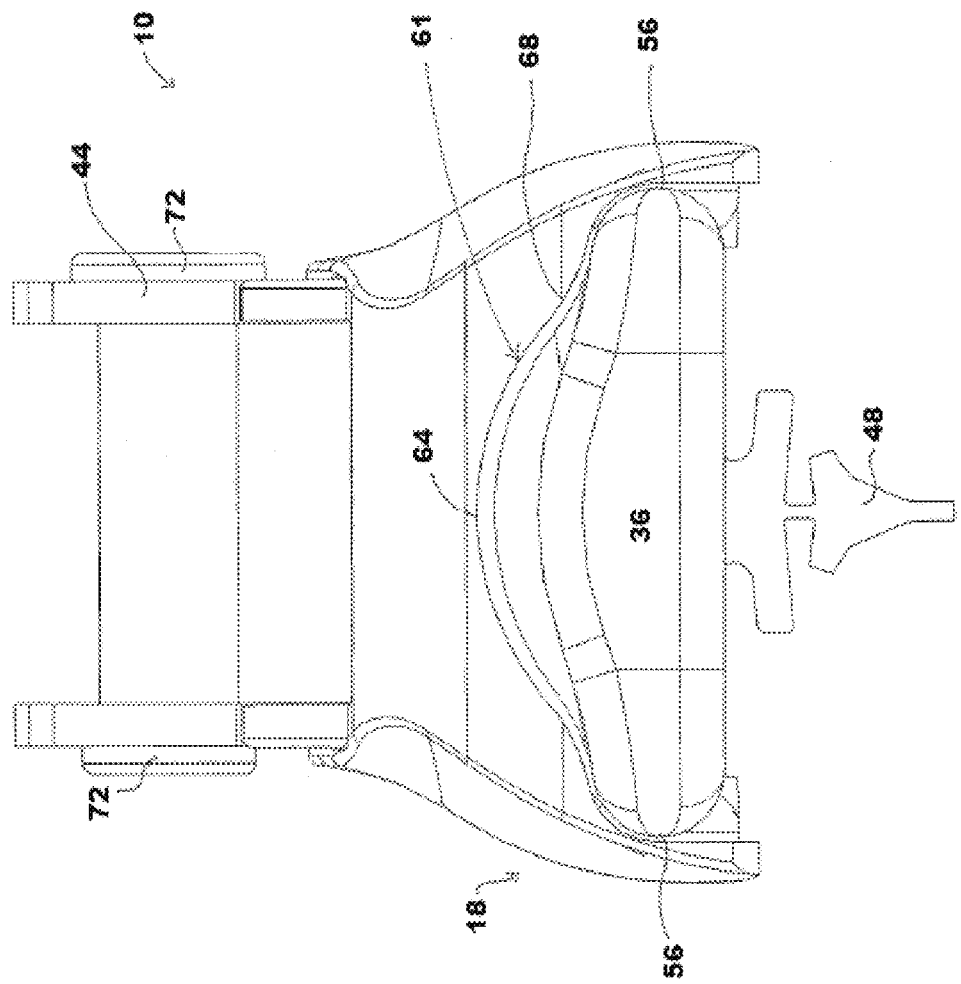
FIG. 7 illustrates a right end view of a second embodiment of a slim profile wiper blade of the present invention.
Figure 8:
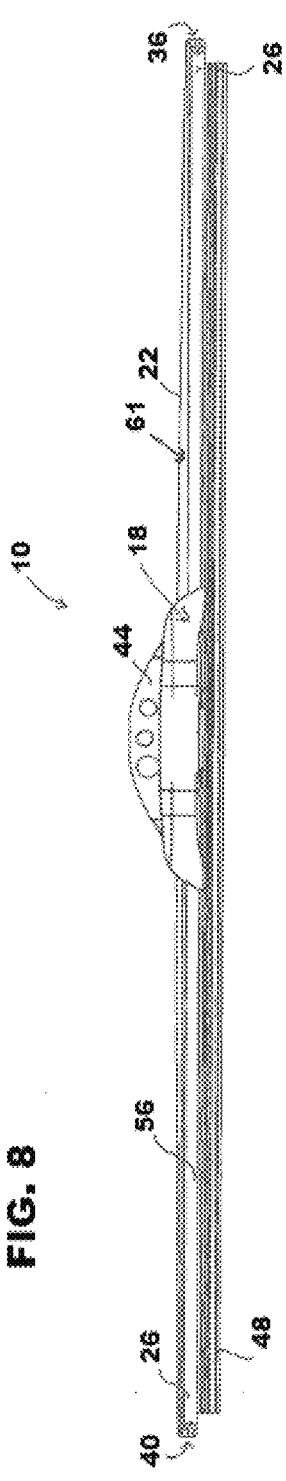
FIG. 8 illustrates a front view of a second embodiment of a slim profile wiper blade of the present invention.
Figure 9:
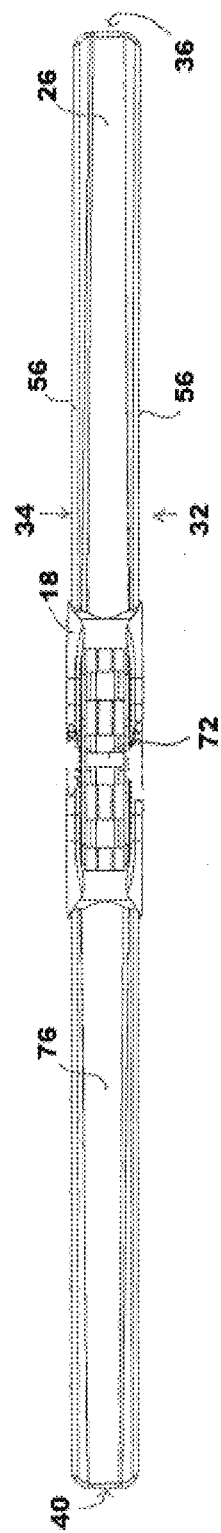
FIG. 9 illustrates a top view of a second embodiment of a slim profile wiper blade of the present invention.

FIGS. 6-10 depict a second preferred embodiment of the wiper blade 10 having an upper surface 76 with a pedestal or base region that supports and defines the outer boundary of the tapered raised portion 61. As best illustrated in FIGS. 6 and 8, tapered raised portion 61 provides a gradual taper that extends nearly the entire length between right end 36 and left end 40. As detailed in connection with the first preferred embodiment, the novel low-profile, slim design of tapered raised portion 61 provides minimized or negligible vortex at the leeward side of wiper blade 10. Further, the gradual taper of the tapered raised portion 61, which is even less pronounced than the taper of the first preferred embodiment described above, provides exceptionally low drag and drastically limits vortex formation on the leeward edge. As best shown in FIGS. 8-10, the second preferred embodiment of the wiper blade 10 includes partially blunted ends 36 and 40. Because this second-preferred embodiment does not have a spoiler, or wind deflector, such embodiments preferably maintain a low profile. The distance from the bottom of the wiper strip to the highest point of the raised portion is preferably less than one inch, and is more preferably a half-inch or less.

As discussed above in connection with the first embodiment of the invention, in certain embodiments, the cover 22 may comprise two sections, each having inner ends in the vicinity of the central bridge 44 of the wiper blade, such that there is a gap between the inner ends of the cover sections which accommodates the central bridge 44. In such embodiments the cover 22 may be provided with a covering cap 18 which covers that gap and the inner ends of the cover sections. The covering cap is provided with a hole to receive the central bridge, and may optionally be extended upwards to also cover the connection area including the central bridge 44, connector 14 (if any) and the wiper arm. Alternatively, the cover 22 may be embodied as a unitary structure, obviating the need for a covering cap.

As also discussed above in connection with the first embodiment, the height of the tapered raised portion 61 may recede into the height of the base portion of the top surface of the cover 22 in the vicinity of (either before the end of or at the end of) the outer ends of the cover such that the tapered raised portion 61 merges with the base portion. Alternatively, the height of the tapered raised portion 61 may still be greater than the height of the base portion of the top surface of the cover at the ends of the cover 22.

As shown in FIGS. 3 and 10, the bottom of the beam 80 may receive and secure the wiper strip 48. The beam 80 is attached to the central bridge 44 at joints 88. These joints may be crimped or welded to the beam, shaped to fit notches in the beam or attached via any other method currently known in the art. It will also be apparent to one of skill in the art that the central bridge 44 is preferably in the middle of the beam 80, but may be located anywhere along the length of the beam 80.

The beam 80 is preferably made from a spring metal, and is generally rectangular, but may taper. The beam 80 may comprise a single strip, or may be two strips that are held together by the central bridge 44, or other bridging devices (not shown) on the ends, or along the length of the beam 80. If a single beam is used, it may be "U" or "0"-shaped, having a groove running longitudinally along the middle of the beam, such that a wiper strip 48 can be slid in between the groove between the sides of the "U" or "0". Alternatively, where the beam 80 may have no such groove, and the wiper strip may be secured to the bottom of the beam 80 by glue or clips, or any other methods currently known in the art for securing the wiper strip to the beam 80.

Cover 22, in turn is fitted or seated on and around the perimeter of beam 80. The cover 22 may be fitted or seated to the ends of the beam 80 by means of detents, securing cavities 28, claws, or other methods currently known in the art. As shown in FIGS. 3 and 10, the cover 22 may be provided with claws which run along the longitudinal sides (i.e. front and rear edges 32, 34 of the beam), and grip it along its length. The claws may run around the entire perimeter of the wiper blade (not shown), or as shown in FIGS. 3 & 10, the claws may end in the vicinity of the outer ends of the cover. Additionally, securing structures, such as detents or securing cavities (28) may be provided on the outer ends of the cover 22 which grip and secure the ends of the beam 80. Optionally, cover 22 can be provided with an interior recess to receive an upper portion of wiper strip 48 and further secure the cover along its entire or a portion of its length. These and other methods of attaching a cover 22 to the surface of a beam 80 may be used and are considered within the scope of the invention. The cover 22 may be made of any suitable material, including natural or synthetic rubber or plastic or any other suitable polymeric material.

It is intended that the foregoing detailed description be regarded as illustrative rather than limiting, and that it be understood that it is the following claims, including all equivalents, that are intended to define the spirit and scope of this invention.

We claim:

1. A wiper blade having two ends, two longitudinal sides, a top side, and a bottom side, the wiper blade comprising:
   a cover disposed on the top side of the wiper blade, the cover having two longitudinal sides, two outer ends and a top surface, wherein
   the cover is disposed on the top side of the wiper blade;
   the top surface of the cover has a base portion having a height and a raised portion having a height wherein the height of the raised portion is greater than the height of the base portion;
   the height of the raised portion gradually decreases as the raised portion approaches the outer ends of the cover; and
   wherein the raised portion has an apex that merges with the base portion before the outer ends of the cover such that multiple cross-sections of the top surface of the cover have a substantially geometrically similar cross-sectional profile along a length of a longitudinal axis that is parallel to the two longitudinal sides of the cover until the apex merges with the base portion, and wherein the base portion has a substantially constant height.

2. The wiper blade of claim 1 wherein the raised portion forms a wind deflection structure having a generally triangular shape when viewed in cross section.

3. The wiper blade of claim 1 wherein the cover is symmetric in shape across a plane that is transverse to the two longitudinal sides of the cover.

4. The wiper blade of claim 1 wherein the cover is symmetric in shape across a plane that extends vertically through a longitudinal axis of the cover.

5. The wiper blade of claim 1 wherein the cover is a unitary structure and is provided with a hole to accommodate a central bridge of the wiper blade.

6. The wiper blade of claim 1 wherein the cover comprises two sections, each section having an inner end, wherein a gap is provided between the inner ends of the two sections to accommodate a central bridge of the wiper blade.

7. The wiper blade of claim 6 wherein a cap is provided that covers the gap and the inner ends of the two sections.

8. A wiper blade cover comprising two longitudinal sides, two outer ends and a top surface;
   wherein:
      the cover is capable of being disposed on the top side of a wiper blade, the wiper blade having two ends, two longitudinal sides, a top side, and a bottom side;
      the top surface of the cover has a base portion having a height and a raised portion having a height wherein the height of the raised portion is greater than the height of the base portion;

the height of the raised portion gradually decreases as the raised portion approaches the outer ends of the cover; and wherein the raised portion has an apex that merges with the base portion before the outer ends of the cover such that multiple cross-sections of the top surface of the cover have a substantially geometrically similar cross-sectional profile along a length of a longitudinal axis that is parallel to the two longitudinal sides of the cover until the apex merges with the base portion, and wherein the base portion has a substantially constant height.

9. The wiper blade cover of claim 8 wherein the raised portion forms a wind deflection structure having a generally triangular shape when viewed in cross-section.

10. The wiper blade cover of claim 8 wherein the cover is symmetric in shape across a plane that is transverse to the two longitudinal sides of the cover.

11. The wiper blade cover of claim 8 wherein the cover is a unitary structure and is provided with a hole to accommodate a central bridge of the wiper blade.

12. The wiper blade cover of claim 8 wherein the cover comprises two sections, each section having an inner end, wherein a gap is provided between the inner ends of the two sections to accommodate a central bridge of the wiper blade.

13. The wiper blade cover of claim 12 wherein the cover further comprises a cap that covers the gap and the inner ends of the two sections.

\* \* \* \* \*